United States Patent
Keidar

(10) Patent No.: US 9,973,485 B2
(45) Date of Patent: May 15, 2018

(54) APPARATUS AND METHOD TO SECURELY RECEIVE A KEY

(71) Applicant: QUALCOMM Incorporated, San Diego, CA (US)

(72) Inventor: Ron Keidar, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days. days.

(21) Appl. No.: 15/486,673

(22) Filed: Apr. 13, 2017

(65) Prior Publication Data

US 2017/0222994 A1 Aug. 3, 2017

Related U.S. Application Data

(62) Division of application No. 14/856,299, filed on Sep. 16, 2015.

(51) Int. Cl.
*H04L 29/06* (2006.01)
*G06F 21/62* (2013.01)

(52) U.S. Cl.
CPC .......... *H04L 63/062* (2013.01); *G06F 21/629* (2013.01); *H04L 63/0876* (2013.01)

(58) Field of Classification Search
CPC ... H04L 9/0863; H04L 9/0877; H04L 63/061; H04L 2463/101; H04L 63/102; G06F 21/6218; G06F 21/44; G06F 21/629; G06F 21/51; G06F 2221/033; G06F 21/10; G06F 2221/2141
See application file for complete search history.

(56) References Cited

U.S. PATENT DOCUMENTS

| | | | |
|---|---|---|---|
| 6,208,851 B1 | 3/2001 | Hanson | |
| RE38,715 E | 3/2005 | Rogers | |
| 6,885,857 B1 | 4/2005 | Hanson | |
| 7,076,656 B2 | 7/2006 | Mackenzie | |
| 7,162,220 B2 | 1/2007 | Hanson | |
| 7,293,289 B1 * | 11/2007 | Loc ........................ | H04W 12/12 726/22 |
| 8,126,145 B1 * | 2/2012 | Tewari .................. | H04L 9/0841 370/401 |
| 8,254,571 B1 | 8/2012 | Boyen | |
| 8,631,247 B2 | 1/2014 | O'Loughlin et al. | |
| 8,832,807 B1 | 9/2014 | Kuo et al. | |
| 9,246,686 B1 | 1/2016 | Holland et al. | |
| 9,602,279 B1 * | 3/2017 | Tran .......................... | H04L 9/14 |
| 9,647,845 B2 * | 5/2017 | Yao ............................ | H04L 9/30 |

(Continued)

OTHER PUBLICATIONS

International Search Report and Written Opinion—PCT/US2016/047833—ISA/EPO—dated Oct. 21, 2016.

*Primary Examiner* — Don G Zhao
(74) *Attorney, Agent, or Firm* — Hunter Clark PLLC

(57) ABSTRACT

Disclosed is a device that obtains and stores a secret key. The device may comprise a transceiver configured to: transmit a command for a secret key to a server; transmit an identifier to the server; and receive a wrapped secret key from the server. The device may further comprise: a storage device; and a processor. The processor may be coupled to the transceiver and the storage device and the processor may be configured to: receive the wrapped secret key from the transceiver; unwrap the wrapped secret key to obtain the secret key; and store the secret key in the storage device.

24 Claims, 5 Drawing Sheets

(56) References Cited

U.S. PATENT DOCUMENTS

| | | |
|---|---|---|
| 9,806,889 B2* | 10/2017 | Yao ........................ H04L 9/3247 |
| 2001/0011228 A1 | 8/2001 | Shenkman |
| 2002/0087393 A1 | 7/2002 | Philonenko |
| 2004/0215564 A1 | 10/2004 | Lawlor et al. |
| 2005/0005134 A1 | 1/2005 | Herrod et al. |
| 2007/0125840 A1 | 6/2007 | Law et al. |
| 2008/0040786 A1 | 2/2008 | Chang |
| 2009/0154675 A1 | 6/2009 | Hanson |
| 2009/0171752 A1 | 7/2009 | Galvin et al. |
| 2010/0306530 A1* | 12/2010 | Johnson ................. G06F 21/335 |
| | | 713/155 |
| 2011/0123026 A1* | 5/2011 | Rebuli .................... B60R 25/00 |
| | | 380/270 |
| 2011/0131414 A1* | 6/2011 | Cheng ..................... H04L 63/06 |
| | | 713/170 |
| 2011/0289591 A1 | 11/2011 | Kaneko |
| 2013/0042111 A1 | 2/2013 | Fiske |
| 2013/0145447 A1 | 6/2013 | Maron |
| 2013/0246260 A1 | 9/2013 | Barten et al. |
| 2013/0326601 A1 | 12/2013 | Nishikawa et al. |
| 2014/0032759 A1* | 1/2014 | Barton .................... H04L 67/10 |
| | | 709/225 |
| 2014/0047555 A1 | 2/2014 | Didier |
| 2014/0250508 A1 | 9/2014 | Hamlin et al. |
| 2014/0279477 A1 | 9/2014 | Sheets et al. |
| 2014/0317417 A1 | 10/2014 | Ashkenazi |
| 2015/0095662 A1 | 4/2015 | Jejurikar et al. |
| 2015/0134962 A1 | 5/2015 | Mahajan et al. |
| 2015/0200937 A1* | 7/2015 | Von Bokern .......... H04L 63/102 |
| | | 726/7 |
| 2015/0317634 A1 | 11/2015 | Angoy |
| 2016/0036825 A1 | 2/2016 | Manroa et al. |
| 2016/0065550 A1 | 3/2016 | Kanov et al. |
| 2016/0241389 A1* | 8/2016 | Le Saint ............... H04L 9/0844 |
| 2017/0076106 A1 | 3/2017 | Keidar |
| 2017/0161486 A1 | 6/2017 | Jeon et al. |

\* cited by examiner

390

| SOFTWARE OPERATION | OPERATION PARAMETER |
|---|---|
| KEY ACTIVATION | INDEX OR BITMAP OF PREDEFINED KEYS TO ACTVATE |
| KEY REVOCATION | INDEX OR BITMAP OF PREDEFINED KEYS TO REVOKE |
| DEBUG RE-ENABLE | LIST OF DEBUG FACILITIES TO RE-ENABLE |
| FEATURE ACTIVATION | LIST OF PRODUCT FEATURES TO ACTIVATE |
| FEATURE DEACTIVATION | LIST OF PRODUCT FEATURES TO DEACTIVATE |

FIG. 3B

APPARATUS AND METHOD TO SECURELY RECEIVE A KEY

CROSS-REFERENCE TO RELATED APPLICATION

This application is a divisional of U.S. patent application Ser. No. 14/856,299, filed Sep. 16, 2015, entitled, "APPARATUS AND METHOD TO SECURELY CONTROL A REMOTE OPERATION," which is herein incorporated by reference.

BACKGROUND

Field

The present invention relates to an apparatus and method to securely control a remote operation.

Relevant Background

When many different security requirements are required for a computing device, it is common place today that many different security solutions are implemented by a chip that consumes a large amount of chip space, are very complex, and are not unified in implementation.

For small computing devices (e.g., Internet of Thing (IoT) devices), lightweight, low cost security solutions that have maximized sets of security features and simple operations, that provide unified implementations, and that consume a very efficient amount of chip space, are desirable.

SUMMARY

Aspects may relate to a device that obtains and stores a secret key. The device may comprise a transceiver configured to: transmit a command for a secret key to a server; transmit an identifier to the server; and receive a wrapped secret key from the server. The device may further comprise: a storage device; and a processor. The processor may be coupled to the transceiver and the storage device and the processor may be configured to: receive the wrapped secret key from the transceiver; unwrap the wrapped secret key to obtain the secret key; and store the secret key in the storage device.

BRIEF DESCRIPTION OF THE DRAWINGS

FIG. 3B is a diagram illustrating examples of software operations and operation parameters.

DETAILED DESCRIPTION

The word "exemplary" or "example" is used herein to mean "serving as an example, instance, or illustration." Any aspect or embodiment described herein as "exemplary" or as an "example" in not necessarily to be construed as preferred or advantageous over other aspects or embodiments.

As used herein, the terms "computing system", "computing device", or "device" may be used interchangeably and may refer to any form of computing device including but not limited to laptop computers, tablets, smartphones, televisions, desktop computers, home appliances, cellular telephones, watches, wearable devices, Internet of Things (IoT) devices, personal television devices, personal data assistants (PDA's), palm-top computers, wireless electronic mail receivers, multimedia Internet enabled cellular telephones, Global Positioning System (GPS) receivers, wireless gaming controllers, receivers within vehicles (e.g., automobiles), interactive game devices, notebooks, smartbooks, netbooks, mobile television devices, system on a chip (SoC), or any computing device or data processing apparatus.

Figure 1:
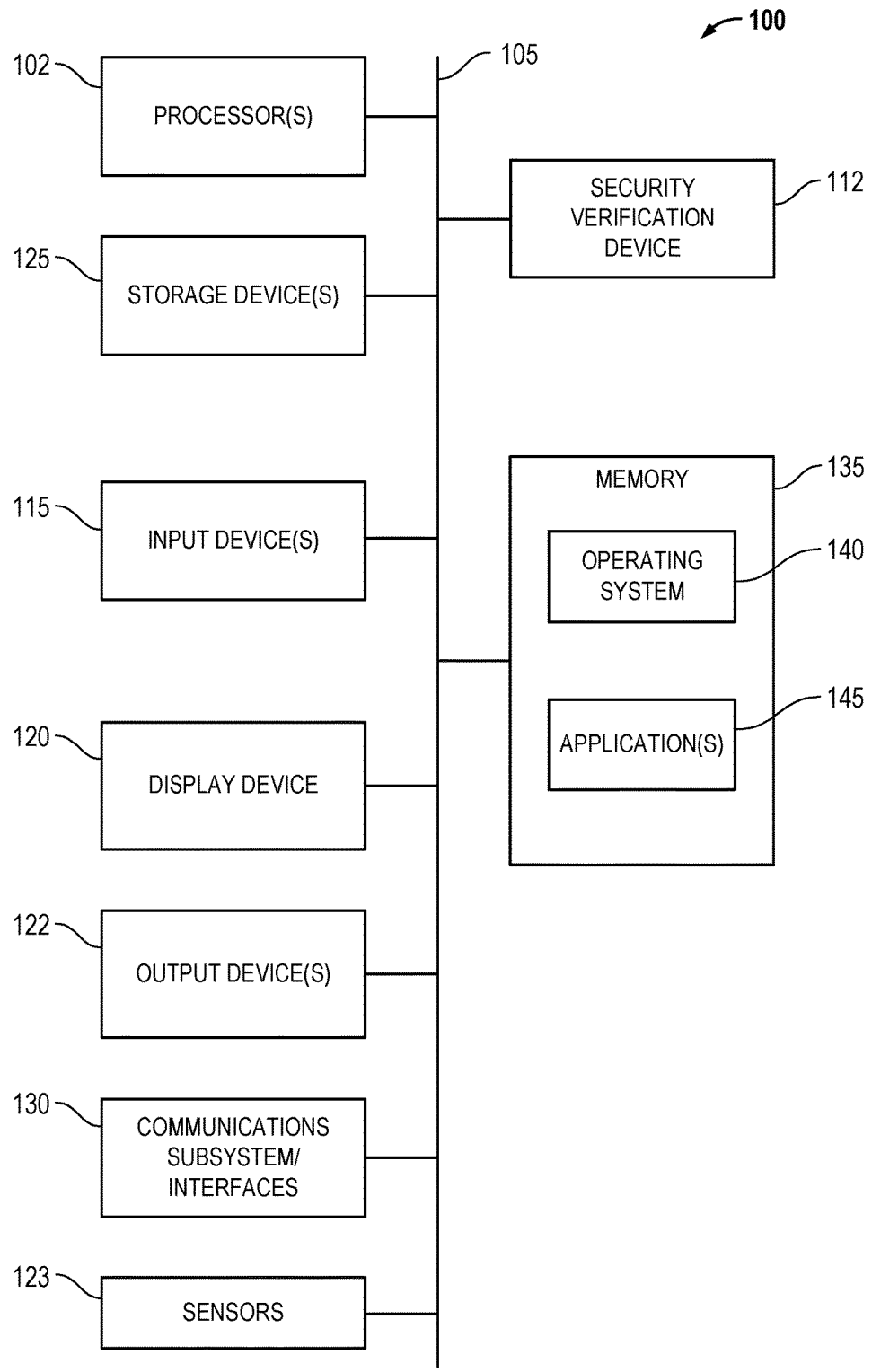
FIG. 1 is a diagram of a computing device in which embodiments may be practiced.

An example device 100 (hereinafter referred to as a computing device) that may utilize a security verification device 112 to securely activate or revoke software operations, as will be hereinafter described in detail, is illustrated in FIG. 1. The computing device 100 is shown comprising hardware elements that can be electrically coupled via a bus 105 (or may otherwise be in communication, as appropriate). The hardware elements may include one or more processors 102, including without limitation one or more general-purpose processors and/or one or more special-purpose processors (such as digital signal processing chips, graphics acceleration processors, and/or the like); one or more input devices 115 (e.g., keyboard, keypad, touchscreen, mouse, etc.); one or more output devices 122, such as a display device 120, and can further include without limitation other output devices, such as, a speaker, a printer, and/or the like. Additionally, computing device 100 may include a wide variety of sensors 123. Sensors 123 may include: a clock, an ambient light sensor (ALS), a biometric sensor (e.g., blood pressure monitor, etc.), an accelerometer, a gyroscope, a magnetometer, an orientation sensor, a fingerprint sensor, a weather sensor (e.g., temperature, wind, humidity, barometric pressure, etc.), a Global Positioning Sensor (GPS), an infrared (IR) sensor, a proximity sensor, near field communication (NFC) sensor, a microphone, a camera. It should be appreciated that computing device 100 may include any type of sensor.

The computing device 100 may further include (and/or be in communication with) one or more non-transitory storage devices 125, which can comprise, without limitation, local and/or network accessible storage, and/or can include, without limitation, a disk drive, a drive array, an optical storage device, solid-state storage device such as a random access memory ("RAM") and/or a read-only memory ("ROM"), which can be programmable, flash-updateable, and/or the like. Such storage devices may be configured to implement any appropriate data stores, including without limitation, various file systems, database structures, and/or the like.

The computing device 100 may also include a communication subsystem and/or interface 130, which can include without limitation a modem, a network card (wireless or wired), an infrared communication device, a wireless communication device and/or chipset (such as a Bluetooth device, an 802.11 device, a Wi-Fi device, a WiMax device, cellular communication devices, etc.), and/or the like. The communications subsystem and/or interface 130 may permit data to be exchanged with a network, other computer systems, and/or any other devices described herein. In many embodiments, the computing device 100 will further comprise a working memory 135, which can include a RAM or ROM device, as described above.

The computing device 100 may also comprise firmware elements, software elements, shown as being currently located within the working memory 135, including an operating system 140, applications 145, device drivers, executable libraries, and/or other code. In one embodiment, an application may be designed to implement methods, and/or configure systems, to implement embodiments, as described herein. Merely by way of example, one or more procedures described with respect to the method(s) discussed below may be implemented as code and/or instructions executable by a computing device (and/or a processor within a computing device); in an aspect, then, such code and/or instructions can be used to configure and/or adapt a computing device 100 to perform one or more operations in accordance with the described methods, according to embodiments described herein.

A set of these instructions and/or code might be stored on a non-transitory computer-readable storage medium, such as the storage device(s) 125 described above. In some cases, the storage medium might be incorporated within a computer system, such as computing device 100. In other embodiments, the storage medium might be separate from a computer system (e.g., a removable medium, such as a compact disc), and/or provided in an installation package, such that the storage medium can be used to program, configure, and/or adapt a general purpose computer with the instructions/code stored thereon. These instructions might take the form of executable code, which is executable by the computerized computing device 100 and/or might take the form of source and/or installable code, which, upon compilation and/or installation on the computing device 100 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware might also be used, and/or particular elements might be implemented in hardware, firmware, software, or combinations thereof, to implement embodiments described herein. Further, connection to other computing devices such as network input/output devices may be employed.

Aspects may relate to utilizing a security verification device 112 in a computing device 100 that implements a key derivation function to provide security features for the device. Such security features may include: passwords; feature control attestation, and other security services. In particular, security verification device 112 may be utilized by computing device 100 to securely authorize or revoke software operations from a processor 102. As an example, in one embodiment, the security verification device 112 may implement a key derivation function (KDF) device and may perform an atomic operation that performs at least three operations: 1) Selecting a KDF input to the KDF device; 2) Including the software command ID in the KDF input so that it is impossible to attack one operation using another operation; and 3) setting the output of the security verification device 112 to include the software command to be performed by the requesting processor. In an atomic operation, the security verification device 112 either authorizes or revokes the software operation of the requesting processor.

Figure 2:
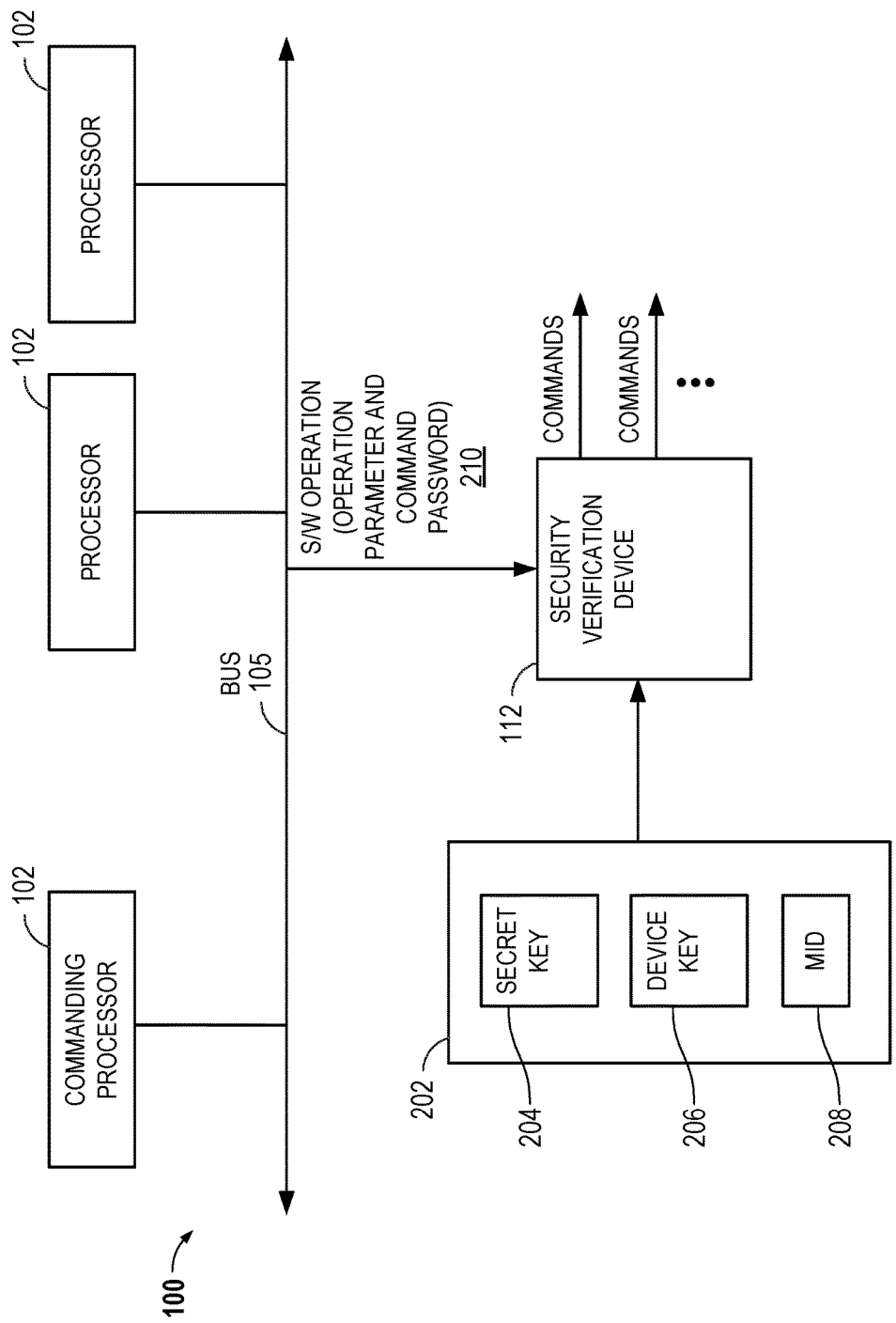
FIG. 2 is a diagram of a system in which embodiments may be practiced.

With additional reference to FIG. 2, in one embodiment, computing device 100 may comprise a plurality of processors 102 and a security verification device 112 coupled together via bus 105. A plurality of hardware attributes 202 may be coupled to the security verification device 112 via bus 105. These hardware attributes may include: a secret key 204; a device key 206; and a master identifier (MID) 208. The secret key 204 and device key 206 may be implemented as one time programmable (OTP) memories. Further, the secret key 204 may be implemented as resistor transistor logic (RTL), ROM, or any suitable type of storage device to store a secret key. MID 208 may be an identifier of a commanding processor 102 that is transmitting a software operation including an operation parameter, as well as, one or more commands to be performed, as will be described. It should be appreciated that there may be multiple secret keys, device keys, MIDs, etc.

As an example, a processor 102 may transmit a software operation 210 to be performed to the security verification device 112. The software operation 210 may include a plurality of commands. In particular, a processor 102 may transmit a software operation 210 to the security verification device 112 that includes an operation parameter and a first password to the security verification device 112. Further, the security verification device 112 is configured to receive a secret key selection from the software operation. Based upon the secret key selection, the security verification device 112 selects a secret key 204 from the hardware attributes 202. The security verification device 112 additionally receives the operation parameter from the processor 102. Based upon these software operation inputs 210, the security verification device 112 is configured to implement a key derivation function (KDF) to generate a second password based upon the selected secret key 204 and the software operation 210 including the operation parameter. In particular, the security verification device 112 determines if the second password matches the first password, and, if so, the security verification device 112 authorizes the performance of the software operation. In this way, the commands of the software operation may be authorized to be performed by the processor 102. However, if the security verification device 112 determines that the second password does not match the first password, the performance of the software operation is revoked. In one embodiment, the second password may be referred to as the hardware password as it is generated by the security verification device 112 and the first password may be referred to as the command password as it generated by the software. Hereinafter, the terms hardware password and command password will be utilized. It should be appreciated that, in one embodiment, the security verification device 112 is configured to determine if the hardware password matches the command password, such that that the software operation 210 is authorized for execution by the processor 102, within a single atomic operation. Also, it should be appreciated that the security verification device 112 is configured to receive and provide routing information for the execution of the commands of the software operation, within a single atomic operation.

Also, in one embodiment, a master identifier (MID 208) identifying the commanding processor 102 that is transmitting the software operation 210 and the operation parameter is transmitted via bus 105 to the security verification device 112. In this implementation, the security verification device 112 is configured to: implement a key derivation function to generate a hardware password (e.g., the second password) based upon the selected secret key 204, the MID 208, and the software operation 210 including the operation parameter. Further, based upon this, the security verification device 112 is configured to determine if the hardware password (e.g., the second password) matches the command password (e.g., the first password) of the commanding processor 102, and, if so, the performance of the software operation 210 is authorized for execution by the commanding processor 102. Alternatively, if the hardware password does not match the command password, the software operation 210 is revoked. Also, the security verification device 112 is configured to receive and provide routing information for the software operation including at least routing information for the commanding processor 102 and routing information for the software, as well as other types of hardware and software routing information. Therefore, the routing information includes hardware destination routing information and software destination routing information, As previously described, the software operation 210 triggers a sequence of hardware operations in which hardware inputs are selected to be utilized by the security verification device 112 and software inputs are set as inputs to the hardware of the security verification device 112, including the commands themselves, the command password, etc. In particular, the operation parameter is set as both an input to the KDF device of the security verification device 112 for authentication and as part of the software operation 210 that can be authorized to be performed if the command password is authenticated and approved. In this case, the software operation 210 may be authenticated and approved for execution by the commanding processor 102. Further, KDF output routings (e.g., software and hardware destinations) and password pass/fail routings are set as software inputs to the hardware of the security verification device 112. Based upon these software inputs, the software operation 210 is either approved or revoked (e.g., if the passwords of the hardware and software match or do not match). If the command password is approved by the security verification device 112, the software operation 210 is approved and the commands are routed back to the commanding processor 102 for execution, and if not, the software operation 210 is revoked, and the commands are rejected and not allowed to be executed by the commanding processor 102. In this manner, the operation parameter of the software operation 210 is utilized as an input to the KDF device such that the hardware password is tied to a pre-defined operation parameter and is utilized in the password approval or disapproval process. Also, the MID is used as a hardware indication of the commanding processor 102 and serves as an input to the KDF device (e.g., different results for different commanding processors) and the commands can be routed back to the commanding processor.

Therefore, utilizing these aspects, software is enabled to do many operations at the hardware level with a very small chipset fingerprint (e.g., the main hardware component being the security verification device 112 including a KDF device). All of the decisions are linked together so that the software needs little protection while the hardware of the security verification device 112 may prevent attacks. Also, the security verification device 112 decides on routing and keys based upon the commanding processor 102—removing the need for access control. Additionally, the atomicity of all of the above operations into one software operation 210, makes the security verification device 112 an extremely powerful tool to perform many operations. In particular, this implementation replaces many previous security solutions.

Figure 3A:
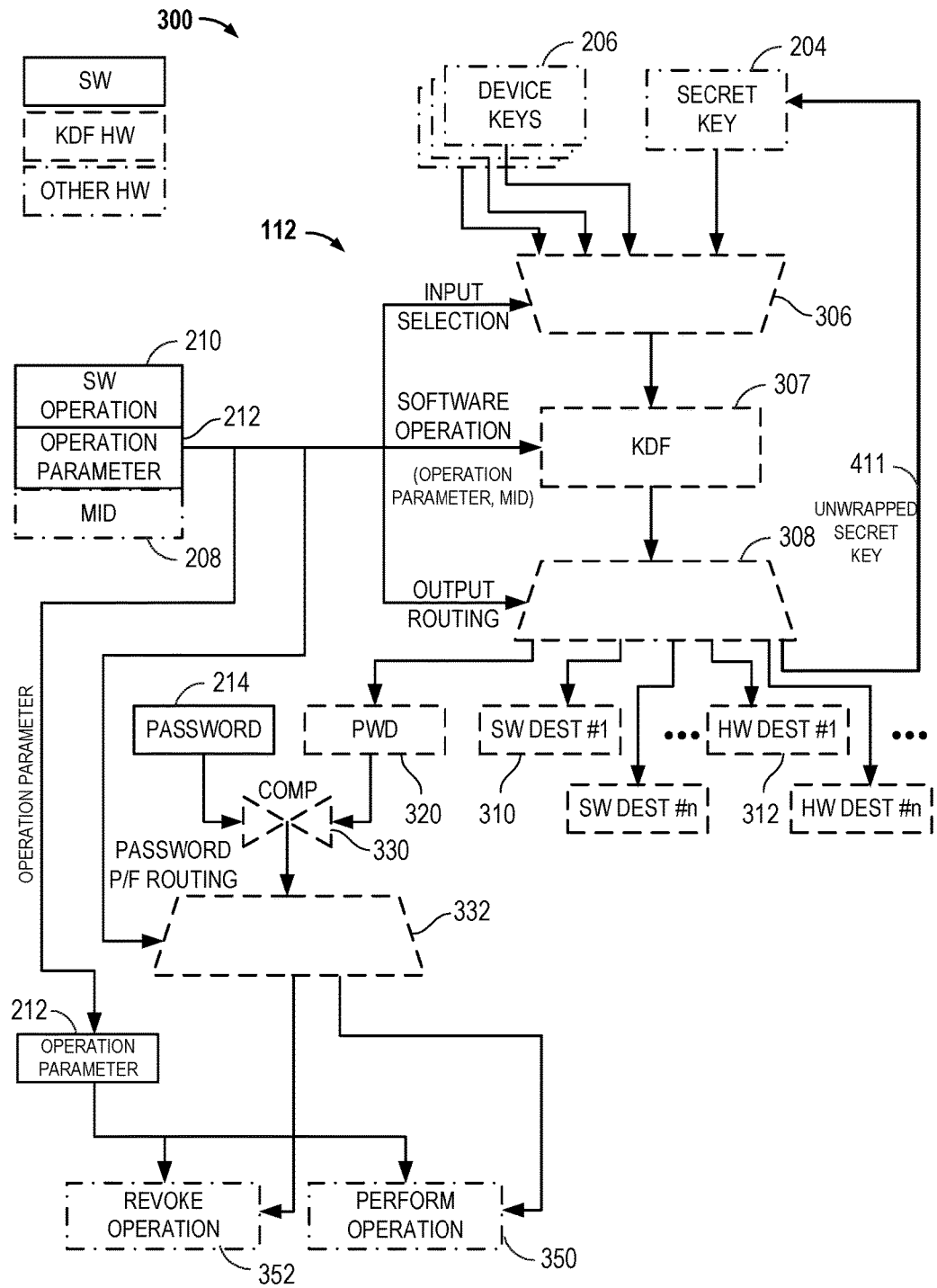
FIG. 3A is a diagram of a system to implement the security verification device including a key derivation function (KDF) device.

With additional reference to FIG. 3A, a system 300 to implement the security verification device 112 including a key derivation function (KDF) device 307 is shown. It should be noted that functions implemented by hardware are in dashed lines and functions implemented by software are in solid lines.

In this example, a commanding processor 102 may transmit a software operation 210 to the hardware components of the security verification device 112. The software operation 210 may include an operation parameter 212. The operation parameter may include particular parameters associated with the software operation. Also, MID 208 identifying the commanding processor 102 may be transmitted via the bus. The software operation 210 may include a command that is being requested to be performed by the commanding processor 102 based upon authorization by the security verification device 112.

In particular, the software operation 210 may transmit an input selection to a hardware data selector 306 to select a secret key 204. It should be appreciated that the input selection may select a particular secret key 204 and/or other device keys 206 that are selected by hardware data selector 306. Further, software operation 210 includes data input to a key derivation function (KDF) device 307. The data input includes the software command itself and the operation parameter.

Based upon this data input and the secret key selection, KDF device 307 implements a key derivation function to generate a hardware password based upon the selected secret key and the software operation 210, operation parameter 212, and the MID 208. The hardware password of KDF device 307 is transmitted through hardware data selection router 308 as hardware password 320 to a hardware comparator 330.

At this point, security verification device 112 compares the hardware password 320 to the command password 214 transmitted by the software operation 210 utilizing the hardware comparator 330. If comparator 330 determines that the hardware password 320 matches the command password 214, then the password pass/fail decision routing device 332 selects the perform operation selector 350, which allows for authorization of the software operation 210 such that the software operation 210 is allowed to be executed by the commanding processor 102. In this way, the software operation 210 is approved or authenticated by the security verification device 112 and is transmitted back to the commanding processor 102 for execution.

On the other hand, if hardware comparator 330 determines that the hardware password 320 does not match the command password 214, then the password pass/fail decision routing device 332 selects the revoke operation selector 352, which revokes the authentication of the software operation 210. In this way, the software operation 210 is revoked by the security verification device 112 such that the requested software operation 210 by the commanding processor 102 is not allowed and is terminated.

Also, it should be appreciated that hardware data selection router 308 of the security verification device 112 based upon received output routing data from the software operation 210 may further include software destinations (1 . . . n) 310 and hardware destinations (1 . . . n) 312 for the commands from the commanding processor 102. Therefore, if the software operation 210 is approved, various software destinations and/or hardware destinations utilized by the commands may be routed. It should be appreciated that such destinations may include processors, memory, software, firmware, sensors, or any software or hardware component.

With additional reference to FIG. 3B, a diagram is shown that provides examples 390 of software operations and operation parameters. Examples 390 of software operations may include: key activation; key revocation; debug re-enable; feature activation; and feature deactivation. For the key activation and key revocation software operations, the operation parameters or parameters may be the index or bitmap of the predefined keys to activate or revoke. For the debug re-enable software operation, the operation parameters or parameters may include a list of debug or monitoring facilities to re-enable. For the feature activation and deactivation software operations, the operation parameters or parameters may be the list of product features to activate or deactivate. Examples of these features for activation or deactivation may include: The number of CPU cores to be utilized and/or their maximum operation frequencies (MHz); Various performance points for Graphic Processor Units GPUs; Various radio interfaces (e.g., Bluetooth, WiFi, Cellular, etc.); The settings for maximum resolution supportable by a video player or camera and/or other related features, such as, frame per second, color depth and dynamic brightness range. Further, example features for activation or deactivation may apply to the device that incorporates the chip (e.g., a SoC), such as: Automotive—the Horse Power the engine can generate; Drones—the upper height limit and distance the Drone may go, etc. It should be appreciated that these are just examples of software operations and corresponding operation parameters and that any suitable software operation may be securely controlled and implemented. Further, it should be appreciated that any type of software operation may be securely controlled remotely utilizing embodiment disclosed herein.

In particular, as previously described, the software operation 210 triggers a sequence of hardware operations in which hardware inputs are selected to be utilized by the security verification device 112 and software inputs are set as inputs to the hardware of the security verification device 112 including the software operation 210 itself and the operation parameter 212, as well as, the MID 208. The operation parameter 212 is set as both an input to the KDF device 307 of the security verification device 112 for authentication purposes, and, as an operation parameter for the software operation 210 to be performed, if the command password 214 is authenticated and approved—in which case the software operation 210 is authenticated and approved for execution by the commanding processor 102 (e.g., perform operation 350). Further, KDF output routings (e.g., software and hardware destinations 310 and 312) and password pass/fail routings are set as software inputs to the hardware of the security verification device 112. Based upon these software inputs, the software operation 210 is either approved or revoked by the hardware (e.g., if the passwords of the hardware and software match or do not match at the hardware comparator 330). If the command password 214 is approved by the hardware of security verification device 112 (i.e., at the comparator 330 compared to hardware password 320), then the password pass/fail decision routing device 332 selects the perform operation selector 350, which allows for authorization of the software operation 210 such that the software operation 210 is allowed to be executed by the commanding processor 102. In this way, the software operation 210 is approved or authenticated by the security verification device 112 and is transmitted back to the commanding processor 102 for execution. On the other hand, if hardware comparator 330 determines that the hardware password 320 does not match the command password 214, then the password pass/fail decision routing device 332 selects the revoke operation selector 352, which revokes the authentication of the software operation 210. In this way, the software operation 210 is revoked by the security verification device 112 such that the requested software operation 210 by the commanding processor 102 is not allowed and is terminated.

In this way, the operation parameter 212 is utilized as an input to the KDF device 307 such that the hardware password 320 is tied to a pre-defined operation parameter 212 and is utilized in the password approval or disapproval process. Also, the MID 208 is used as a hardware indication of the commanding processor 102 and serves as an input to the KDF device 307 (e.g., different results for different commanding processors) and the commands can be routed back to the commanding processor 120.

Thus, utilizing these aspects, software is enabled to do many operations at the hardware level with a very small chipset fingerprint (e.g., the main hardware component being the security verification device 112 including the KDF device 307). All of the decisions are linked together so that the software needs little protection while the hardware of the security verification device 112 may prevent attacks. In particular, the security verification device 112 decides on routing and keys based upon the commanding processor 102—removing the need for access control. Additionally, the atomicity of all of the above operations into one software operation 210, makes the security verification device 112 an extremely powerful tool to perform many operations. In particular, this implementation replaces many previous security solutions.

Figure 4:
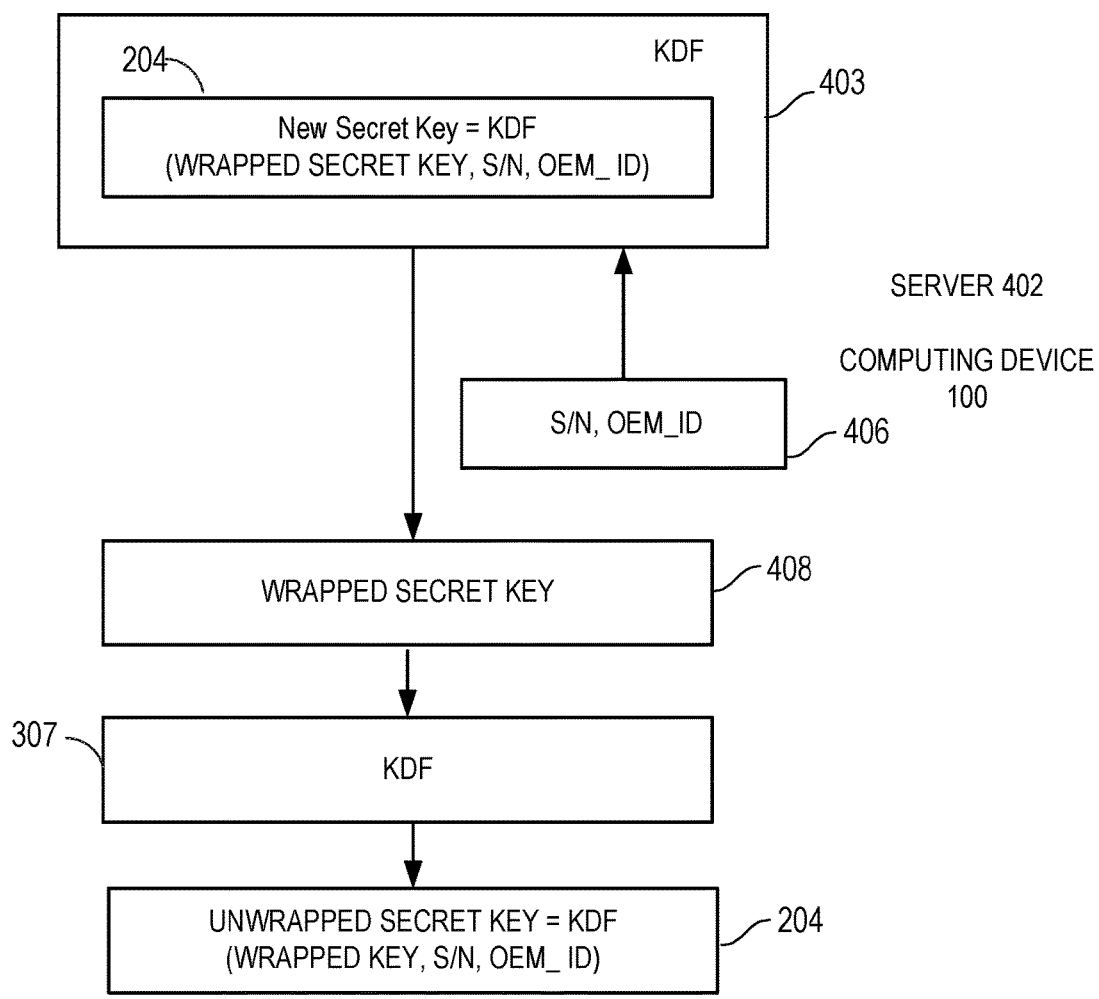
FIG. 4 is a diagram of system to generate a new secret key.

With additional reference to FIG. 4, in conjunction with FIG. 3A, in one embodiment, the secret key 204 may be based upon a wrapped secret key that is generated and transmitted from a server 402 to the computing device 100, as a wrapped secret key 408. For example, in one embodiment, a first software operation 210 by processor 102 of the computing device may command a new secret key from a server 402. In this embodiment, the new secret key 204 may be generated at the server 402, but may be transmitted as a wrapped secret key 408 to the computing device 100. In this way, based upon a request by the computing device 100, the server 402, repeating the KDF calculation 403, generates a new secret key 204 for the computing device 100 that is transmitted as wrapped secret key 408, such that the computing device 100 may generate the secret key 204, based upon the KDF device 307 of the computing device 100, utilizing only the wrapped secret key 408. The wrapped key implementation provides a method in which the new secret key is not exposed in delivery or even to the computing device's software.

For example, a software operation 210 of the computing device 100 may request a new secret key from the server 402. In this example, computing device 100 may transmit a new secret key request through communication interface 130 (e.g., a transceiver) to server 402. Based upon this, server 402 may request an identifier of the computing device 100, such as, the computing device's 100 serial number (S/N) and/or original equipment manufacturer ID (OEM_ID) 406. Computing device 100 may then transmit its SN and OEM_ID 406 to server 402. It should be appreciated that server 402 may include an appropriate processor, memory, transceiver, etc., to implemented the previous and hereinafter described functionality. In particular, server 403 implements a KDF calculation 403 that is similar/linked and/or the same as the KDF calculation of KDF 307 of the computing device 100, to implement this functionality.

Based upon the received SN and OEM_ID 406, server 402 may generate a new secret key 204 utilizing KDF calculation 403. In particular, server 402 utilizing KDF calculation 403 may generate a new secret key 204. The new secret key 204 may be generated by a key derivation function of at least the wrapped secret key, the S/N of the computing device 100, and the OEM_ID of the computing device 100. Based upon this, server 402 may transmit the wrapped secret key 408 to the computing device 100. Thus, only the wrapped secret key 408 may be transmitted to the computing device. It should be noted that new secret key 204 itself is not transmitted (e.g., only the wrapped secret key).

Based upon the received wrapped secret key 408, the processor 102 of computing device 100 commands a second software operation 210 to the KDF 307 to unwrap the wrapped secret key 408. Because the computing device 100 and the server 402 utilize the same KDF and utilize the same S/N and OEM_ID, the KDF 307 of the computing device 100 generates an unwrapped secret key 204, based upon the received wrapped key 408, along with the known S/N and OEM_ID, and via hardware router 308 and bus 411, transmits the new secret key 204 for storage in a storage device (see FIG. 3A). As previously described, the secret key 204 may be stored in OTP, ROM, etc. This secret key 204 may then be utilized by software operations for further commands and function, as previously described in detail. It should be appreciated that other factors such as the ID of the command processor, global keys, etc., may be utilized as additional KDF inputs. In this way, a secret key may be sent over the air (OTA) in a secure and low cost fashion. The new secret key may be generated and transmitted at any instance when computing device 100 requests a new secret key from server 402. The wrapped key implementation provides a method in which the new secret key is not exposed in delivery or even to the computing device's software.

It should be appreciated that aspects of the invention previously described may be implemented in conjunction with the execution of instructions by processors (e.g., processor 102) of the devices (e.g., computing device 100), as previously described. Particularly, circuitry of the devices, including but not limited to processors, may operate under the control of a program, routine, or the execution of instructions to execute methods or processes in accordance with embodiments of the invention (e.g., the processes and functions of FIGS. 2-4). For example, such a program may be implemented in firmware or software (e.g. stored in memory and/or other locations) and may be implemented by processors and/or other circuitry of the devices. Further, it should be appreciated that the terms device, processor, microprocessor, circuitry, controller, SoC, etc., refer to any type of logic or circuitry capable of executing logic, commands, instructions, software, firmware, functionality, etc.

It should be appreciated that when the devices are wireless devices that they may communicate via one or more wireless communication links through a wireless network that are based on or otherwise support any suitable wireless communication technology. For example, in some aspects the wireless device and other devices may associate with a network including a wireless network. In some aspects the network may comprise a body area network or a personal area network (e.g., an ultra-wideband network). In some aspects the network may comprise a local area network or a wide area network. A wireless device may support or otherwise use one or more of a variety of wireless communication technologies, protocols, or standards such as, for example, 3G, LTE, Advanced LTE, 4G, 5G, CDMA, TDMA, OFDM, OFDMA, WiMAX, and WiFi. Similarly, a wireless device may support or otherwise use one or more of a variety of corresponding modulation or multiplexing schemes. A wireless device may thus include appropriate components (e.g., air interfaces) to establish and communicate via one or more wireless communication links using the above or other wireless communication technologies. For example, a device may comprise a wireless transceiver with associated transmitter and receiver components (e.g., a transmitter and a receiver) that may include various components (e.g., signal generators and signal processors) that facilitate communication over a wireless medium. As is well known, a wireless device may therefore wirelessly communicate with other mobile devices, cell phones, other wired and wireless computers, Internet web-sites, etc.

The teachings herein may be incorporated into (e.g., implemented within or performed by) a variety of apparatuses (e.g., devices). For example, one or more aspects taught herein may be incorporated into a phone (e.g., a cellular phone), a personal data assistant ("PDA"), a tablet, a wearable device, an Internet of Things (IoT) device, a mobile computer, a laptop computer, an entertainment device (e.g., a music or video device), a headset (e.g., headphones, an earpiece, etc.), a medical device (e.g., a biometric sensor, a heart rate monitor, a pedometer, an EKG device, etc.), a user I/O device, a computer, a wired computer, a fixed computer, a desktop computer, a server, a point-of-sale device, a set-top box, or any other type of computing device. These devices may have different power and data requirements.

In some aspects a wireless device may comprise an access device (e.g., a Wi-Fi access point) for a communication system. Such an access device may provide, for example, connectivity to another network (e.g., a wide area network such as the Internet or a cellular network) via a wired or wireless communication link. Accordingly, the access device may enable another device (e.g., a WiFi station) to access the other network or some other functionality.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, firmware, or combinations of both. To clearly illustrate this interchangeability of hardware, firmware, or software, various illustrative components, blocks, modules, circuits, and steps have been described above generally in terms of their functionality. Whether such functionality is implemented as hardware, firmware, or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA), a system on a chip (SoC), or other programmable logic device, discrete gate or transistor logic, discrete hardware components, or any combination thereof designed to perform the functions described herein. A general purpose processor may be a microprocessor or may be any type of processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in firmware, in a software module executed by a processor, or in a combination thereof. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the functions described may be implemented in hardware, software, firmware, or any combination thereof. If implemented in software as a computer program product, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a web site, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-Ray disc where disks usually reproduce data magnetically, while discs reproduce data optically with lasers. Combinations of the above should also be included within the scope of computer-readable media.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A device comprising:
   a transceiver configured to:
      transmit a request for a secret key to a server;
      transmit an identifier comprising at least one of a device serial number or a manufacturer identifier to the server;
      receive a wrapped secret key from the server;
   a storage device; and
   a processor coupled to the transceiver and the storage device, the processor configured to:
      receive the wrapped secret key from the transceiver;
      unwrap the wrapped secret key to obtain the secret key, wherein unwrapping the wrapped secret key further comprises utilizing a key derivation function with the wrapped secret key and the identifier as inputs; and
      store the secret key in the storage device.

2. The device of claim 1, wherein the identifier further comprises at least one of an identifier of a command processor or a global key.

3. The device of claim 1, wherein a first software operation by the processor commands the secret key from the server.

4. The device of claim 3, wherein a second software operation by the processor commands unwrapping the wrapped secret utilizing the key derivation function implemented by a key derivation device and storing the secret key in the storage device.

5. The device of claim 4, wherein the server utilizes a key derivation function to generate the wrapped secret key that is linked to the key derivation function of the device.

6. The device of claim 1, wherein the storage device is a one-time programmable (OTP) memory or a ROM.

7. A method comprising:
   transmitting a request for a secret key to a server;
   transmitting an identifier comprising at least one of a device serial number or a manufacturer identifier to the server;
   receiving a wrapped secret key from the server;
   unwrapping the wrapped secret key to obtain the secret key, wherein unwrapping the wrapped secret key further comprises utilizing a key derivation function with the wrapped secret key and the identifier as inputs; and
   storing the secret key in a storage device.

8. The method of claim 7, wherein the identifier further comprises at least one of an identifier of a command processor or a global key.

9. The method of claim 7, further comprising a first software operation that commands the secret key from the server.

10. The method of claim 9, further comprising a second software operation that commands: unwrapping the wrapped secret utilizing the key derivation function implemented by a key derivation device; and storing the secret key in the storage device.

11. The method of claim 10, wherein the server utilizes a key derivation function to generate the wrapped secret key that is linked to the key derivation function.

12. The method of claim 7, wherein the storage device is a one-time programmable (OTP) memory or a ROM.

13. A non-transitory computer-readable medium including code that, when executed by a processor of a device, causes the processor to:
   transmit a request for a secret key to a server;
   transmit an identifier comprising at least one of a device serial number or a manufacturer identifier to the server;
   receive a wrapped secret key from the server;
   unwrap the wrapped secret key to obtain the secret key, wherein unwrapping the wrapped secret key further comprises utilizing a key derivation function with the wrapped secret key and the identifier as inputs; and
   store the secret key in a storage device.

14. The computer-readable medium of claim 13, wherein the identifier further comprises at least one of an identifier of a command processor or a global key.

15. The computer-readable medium of claim 13, further comprising code to command the secret key from the server.

16. The computer-readable medium of claim 15, further comprising code to: unwrap the wrapped secret utilizing the key derivation function implemented by a key derivation device; and store the secret key in the storage device.

17. The computer-readable medium of claim 16, wherein the server utilizes a key derivation function to generate the wrapped secret key that is linked to the key derivation function.

18. The computer-readable medium of claim 13, wherein the storage device is a one-time programmable (OTP) memory or a ROM.

19. A device comprising:
means for transmitting a request for a secret key to a server;
means for transmitting an identifier comprising at least one of a device serial number or a manufacturer identifier to the server;
means for receiving a wrapped secret key from the server;
means for unwrapping the wrapped secret key to obtain the secret key, wherein unwrapping the wrapped secret key further comprises utilizing a key derivation function with the wrapped secret key and the identifier as inputs; and
means for storing the secret key in a storage device.

20. The device of claim 19, wherein the identifier further comprises at least one of an identifier of a command processor or a global key.

21. The device of claim 19, further comprising means for commanding the secret key from the server.

22. The device of claim 21, further comprising means for: unwrapping the wrapped secret utilizing the key derivation function implemented by a key derivation device; and storing the secret key in the storage device.

23. The device of claim 22, wherein the server utilizes a key derivation function to generate the wrapped secret key that is linked to the key derivation function.

24. The device of claim 19, wherein the storage device is a one-time programmable (OTP) memory or a ROM.

* * * * *